United States Patent [19]

Lavery et al.

[11] 4,001,500
[45] Jan. 4, 1977

[54] AMPLIFIER FOR USE IN A DOCUMENT SCANNING SYSTEM

[75] Inventors: Lawrence P. Lavery, Fairport; David R. Shuey, Webster, both of N.Y.

[73] Assignee: Xerox Corporation, Stamford, Conn.

[22] Filed: Nov. 21, 1974

[21] Appl. No.: 525,694

[52] U.S. Cl. .................. 358/282; 178/DIG. 26; 178/DIG. 29
[51] Int. Cl.² ............... H04N 3/10; H04N 5/16
[58] Field of Search ......... 178/7.1, 7.6, 7.2, 6.6, 178/6, DIG. 26, DIG. 29; 346/74 L, 109; 350/6, 7

[56] References Cited

UNITED STATES PATENTS

| | | | |
|---|---|---|---|
| 2,004,497 | 8/1957 | Eliot | 178/7.1 |
| 2,918,525 | 12/1959 | Fricks | 178/6.6 R |
| 3,274,335 | 9/1966 | Gray | 178/7.1 |
| 3,349,174 | 10/1967 | Warschauer | 178/7.1 |
| 3,379,826 | 4/1968 | Gray | 178/DIG. 26 |
| 3,515,803 | 6/1970 | Lorang | 178/7.1 |
| 3,564,301 | 2/1971 | McGhee | 178/DIG. 26 |
| 3,600,506 | 8/1971 | Richeson | 178/7.1 |
| 3,602,641 | 8/1971 | Heise | 178/7.2 |
| 3,619,493 | 11/1971 | Krallinger et al. | 178/6 |
| 3,719,780 | 3/1973 | Gazard et al. | 178/7.6 |
| 3,818,126 | 6/1974 | Fomenko et al. | 178/7.6 |

FOREIGN PATENTS OR APPLICATIONS 1,045,854  10/1966  United Kingdom ........ 178/DIG. 26

*Primary Examiner*—John C. Martin

[57] ABSTRACT

A video amplifier for use in a document scanning system to provide signals representative of the information content of a scanned document. The amplifier includes an automatic background control portion and an automatic black level adjustment portion to maintain the integrity of the output voltage range independent of the background of the scanned document and throughout the period of time required to scan the entire document. In addition, circuitry is provided for varying the time constant of the automatic background control circuitry to make that circuitry respond quickly to changes of the background toward the "white" direction. Further, the normally white platen back is provided with a gray leading edge to prevent the automatic background control circuitry from being upset by initial runs of white in the event of an imperfectly registered non-white document.

9 Claims, 3 Drawing Figures

AMPLIFIER FOR USE IN A DOCUMENT SCANNING SYSTEM

BACKGROUND OF THE INVENTION

This invention relates to document scanning systems and, more particularly, to circuitry responsive to light reflected from a scanned document to provide output signals representative of the information content of the scanned document.

This invention finds particular utility in a facsimile transmitter wherein an information bearing document is scanned by a source of light and the light reflected from the document is converted into an information bearing electrical signal suitable for transmission over a communitcation channel to a facsimile receiver which then converts the information bearing electrical signal into an information bearing document which is a facsimile, or remote reproduction, of the original scanned document. The prior art is replete with examples of facsimile transmitters which utilize a light source, a photodetector, and a means for systematic motion in two dimensions between the light source and photodetector as a unit and the copy to be transmitted. This provides for raster scanning of the original document. One conventional way of accomplishing this scanning is to mount the document on a drum, rotate the drum with the document wrapped thereabout, and move the light source and photodetector along a line parallel to the axis of the drum. This results in a helical scanning pattern. Another means of accomplishing the scanning of a document is to slowly advance the document past a line-like scanning station, the photodetector being fixed to capture light reflected from the document. In all of these prior art systems, the light impinging on the photodetector is converted thereby into an electrical signal, which is then amplified to suitably modulate a carrier signal for transmission over a communication channel to the remote receiver. In all these systems, it is desirable to be able to transmit the information content of a document independent of the background density of the document without transmitting a background level signal that would deteriorate the quality of the reproduced image.

It is therefore an object of this invention to provide an amplifier for use in a document scanning system.

It is a further object of this invention to provide an amplifier with automatic background control circuitry which adjusts to the background level of the document to be transmitted.

It is yet another object of this invention to provide circuitry which compensates for the inherent dark current of the photodetector so that a signal representative only of the information content of the document is provided.

Other objects of the present invention will be evident from the description hereinafter presented.

SUMMARY OF THE INVENTION

In accordance with principles illustrative of this invention, the foregoing objectives are attained by providing an amplifier which includes an automatic black level adjust circuit and an automatic background control circuit. The automatic black level adjust circuit compensates for the dark current of the photodetector by providing signals which adjust the amplifier output to a pre-set "black level" during a period when no light impinges on the photodetector. The automatic background control circuit compensates for different documents having different background densities so that only the information portions of the document are transmitted as information signals. In addition, there is provided a gray area on the normally white platen back at the end corresponding to the leading edge of the scan line in order to prevent the automatic background control from being upset by initial runs of white in the event of an imperfectly registered nonwhite document.

DESCRIPTION OF THE DRAWING

The foregoing will become more readily apparent upon reading the following description in conjunction with the drawing in which.

GENERAL DESCRIPTION OF THE EXEMPLARY EMBODIMENT

Figures 1, 2:
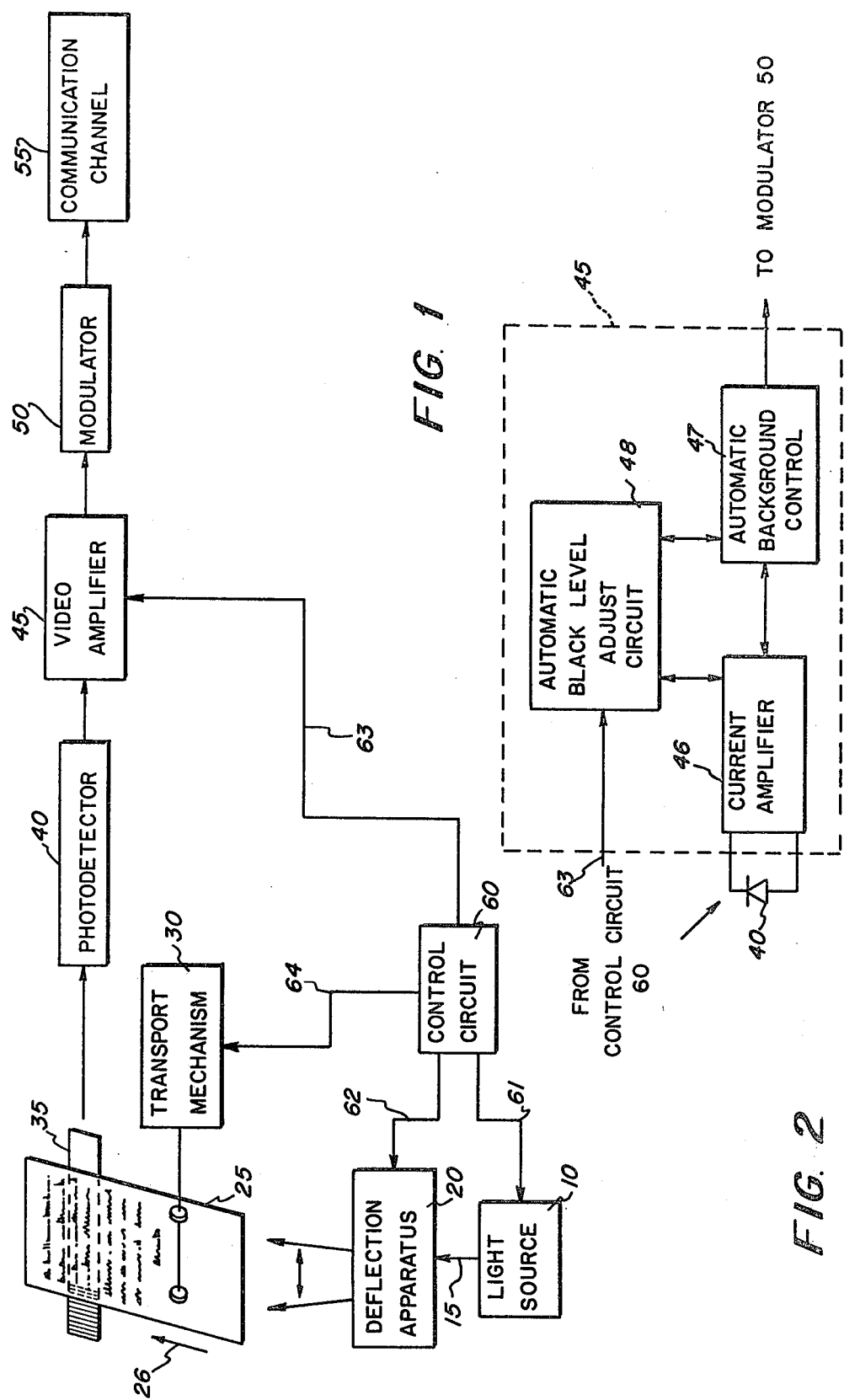
FIG. 1 is an illustrative simplified schematic diagram of a facsimile transmitter in which the principles of this invention may be incorporated.
FIG. 2 is a block diagram of an amplifier constructed in accordance with the principles of this invention.

Turning now to the drawing, depicted in FIG. 1 is a simplified schematic representation of an illustrative facsimile transmitter in which may be incorporated an amplifier operating in accordance with the principles of this invention. Such a transmitter is disclosed, for example, in U.S. Pat. No. 3,869,569 (which issued Mar. 4, 1975, on an application filed May 16, 1972, under Ser. No. 253,828), the disclosure of which is hereby incorporated by reference. As shown in FIG. 1, the illustrative facsimile transmitter includes a light source 10 for emitting a beam of light 15. As disclosed in the aforementioned patent application, light source 10 may be a laser. Light beam 15 is directed, by optical means not shown, to deflection apparatus 20. Deflection apparatus 20 deflects the light beam onto a document 25 at a scanning station and may comprise a planar reflecting mirror mounted on a galvanometer which is driven in an oscillatory fashion. Alternatively, deflection apparatus 20 may comprise a rotating multifaceted polygonal mirror. As the light beam is swept across the scanning station by deflection apparatus 20, document 25 is moved in a direction transverse to the scanning station, as shown by arrow 26, by transport mechanism 30.

At the scanning station, platen back 35 is utilized to keep the document 25 flat along the line where the light beams hits it. The light reflected from document 25 is collected by photodetector 40, which for illustrative purposes may comprise a photosensitive strip diode mounted adjacent document 25 and opposite the platen back 35 so that it collects all light reflected from document 25. Photodetector 40 provides an electrical signal which bears a direct relationship to the magnitude of the light impinging thereon. This signal is applied to video amplifier 45 which amplifies the electrical signal from photodetector 40 and applies this amplified signal to modulator 50 which modulates the signal in any one of several well-known techniques, such as amplitude modulation or frequency modulation. The modulated signal is then applied to communication channel 55, at the other end of which is a facsimile receiver operative to reproduce document 25 in response to received signals over communication channel 55.

The operation of the transmitter depicted in FIG. 1 is under the control of signals generated by control circuit 60 which monitors the status of transmission to generate these control signals. For example, control circuit 60 generates signals on line 61 to turn on and turn off light source 10. Signals are generated on line 62 to drive deflection apparatus 20. If deflection apparatus 20 comprises a planar mirror mounted on a galvanometer, the signals on line 62 would be a sawtooth waveform which would cause the galvanometer to oscillate such that the light beam scans across the document at a first rate and then retraces at a second rate. During the retrace interval, the signal on line 61 turns off light source 10. A signal on line 63 from control circuit 60 to video amplifier 45 is generated by control circuit 60 during the retrace time of the light beam so that video amplifier 45 may provide a black level adjustment during the time that there is no light impinging on photodetector 40, since light source 10 is turned off. This compensates for leakage current from photodetector 40. Control signals on line 64 cause transport mechanism 30 to move document 25 across the scanning station in synchronism with the deflections of the light beam by deflection apparatus 20. Control circuit 60 forms no part of the present invention and any suitable control circuit may be utilized.

Turning now to FIG. 2, depicted therein is a simplified block diagram of video amplifer 45, constructed in accordance with the principles of this invention. Photodetector 40 may be treated as a current source which supplies current in accordance with the amount of light impinging thereon. Photodetector 40 is connected to current amplifier 46 which is connected to automatic background control 47 and automatic black level adjust circuit 48, automatic black level adjust circuit 48 and automatic background control 47 also being interconnected. Automatic black level adjust circuit 48 responds to a signal on line 63 from control circuit 60 during the retrace time of the scanning cycle when the light source is turned off. During this time the only current that photodetector 40 provides to current amplifier 46 is leakage current. During this time the output of the automatic background control 47 to modulator 50 should be at a level corresponding to black. Automatic black level adjust circuit 48 looks at this output signal level and adjusts current amplifier 46 accordingly. During document scanning, automatic background control 47 responds to the minimum signals coming from current amplifier 46, which is an inverting amplifier. These signals correspond to the background of the document 25 being scanned. The output signals to modulator 50 are then adjusted by automatic background control 47 to compensate for different document backgrounds. The preceding discussion will become clear from the following detailed description read in conjunction with the detailed circuit schematic of FIG. 3.

DETAILED DESCRIPTION

Figure 3:
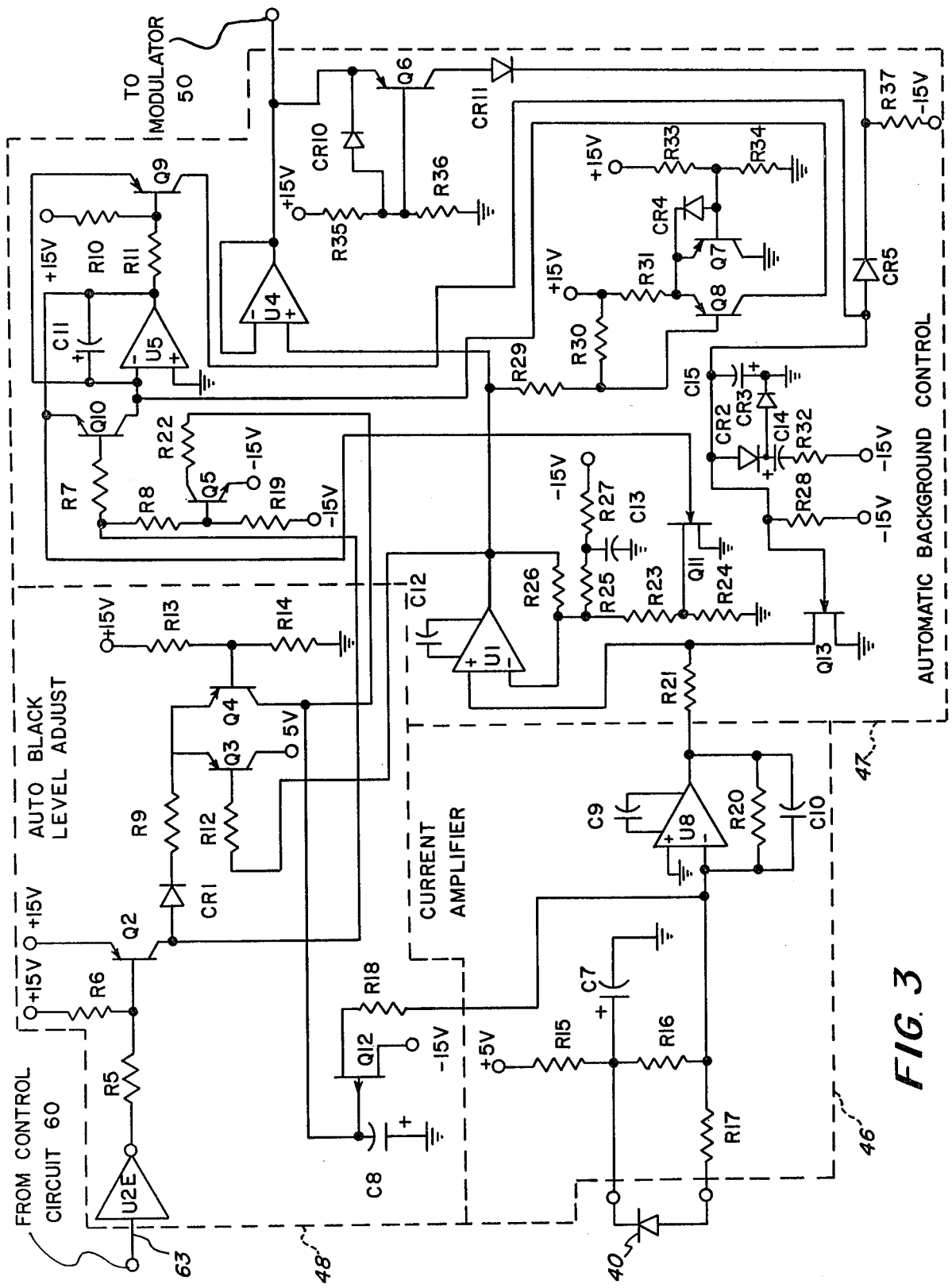
FIG. 3 is a detailed schematic diagram of the circuit whose block diagram is depicted in FIG. 2 and which operates in accordance with the principles of this invention.

Referring now to FIG. 3, it is seen that photodetector 40 is connected to current amplifier 46. Photodetector 40 acts as a current source, providing current in proportion to the amount of light impinging thereon. Current amplifier 46 comprises operational amplifier U8 which is arranged as an inverting amplifier. During the retrace time of the deflection apparatus 20 (FIG. 1), light source 10 (FIG. 1) is turned off so there should be no light impinging on photodetector 40. Therefore, during this time, there should be no current from photodetector 40. The output of amplifier U8 during this time should therefore be at zero volts. With the output of amplifier U8 at zero volts, the noninverting input terminal of amplifier U1 is also at zero volts. In order for amplifier U1 to be stable, the voltage at its inverting input terminal must also be at zero volts. Therefore, there is not current flowing through resistors R23 and R24. The voltage at the output of amplifier U1 causes current to flow through R26, which must equal the current flowing through resistors R25 and R27. The values of resistors R25, R26 and R27 are chosen such that under these circumstances the voltage at the output of amplifier U1 is +10 volts. This is under ideal conditions with no light impinging on photodetector 40. However, typically there is some leakage current from photodetector 40. The purpose of automatic black level adjust circuit 48 is to compensate for this leakage current.

During the retrace time, control circuit 60 supplies a positive signal on lead 63. This turns off automatic black level adjust circuit 48 which comprises a differential amplifier including transistors Q3 and Q4, and a current source including field effect transistor Q12. During the retrace time, the positive signal on line 63 is inverted by inverter U2E and causes the differential amplifier Q3/Q4 to turn on. The output of amplifier U1 is connected to the base of transistor Q3. The base of transistor Q4 is at +10 volts, provided by the resistor divider network including resistors R13 and R14. When the output of amplifier U1 is below 10 volts, transistor Q4 conducts. When transistor Q4 conducts, it tries to charge capacitor C8 positively. Transistor Q5 conducts when transistor Q2 is turned on by the signal on line 63. When transistor Q5 is conducting, it pulls capacitor C8 down toward −15 volts with a fixed amount of current flow. Transistor Q4 tries to balance that out by charging capacitor C8 in a positive direction, so as the output of amplifier U1 approaches +10 volts, capacitor C8 charges. When the output of amplifier U1 reaches +10 volts transistor Q4 turns off and transistor Q3 conducts. Therefore, capacitor C8 starts discharging because transistor Q5 is still conducting and trying to discharge capacitor C8 back to −15 volts. Thus, the differential amplifier comprised of transistors Q3 and Q4 keeps switching on and off and tries to adjust the current into the inverting input terminal of amplifier U8 to zero.

To summarize the foregoing, during the retrace time there is a positive signal applied to line 63 and the light source 10 is turned off so the only current from photodetector 40 is leakage current. In addition to the leakage current, coming into the inverting input terminal of amplifier U8 is a certain amount of biasing current from the supply through resistor R16. In addition, transistor Q12, a FET current amplifier, is trying to compensate for the current flowing into the inverting input of amplifier U8 by pulling current away from that point so that there is essentially zero current at that point and therefore zero volts at the output of amplifier U8. So, in effect what is done is to DC bias the input of amplifier U8 to eliminate the effects of the leakage current of photodetector 40 so that when the document is scanned, all that is seen is signal current, no leakage current.

Thus, during the pulse on line 63, the output of amplifier U8 goes to zero volts and the output of amplifier U1 goes to +10 volts and is regulated at that point until the pulse on line 63 is removed. When this pulse ends, transistor Q2 turns off, thereby turning off transistor Q5. This turns off the differential amplifier comprised of transistors Q3 and Q4, and the charge remaining on capacitor C8 holds the last bit of information it had about where the black level should be. Thus, the maximum black level that ever can be gotten out of photodetector 40 is now set.

During the retrace time, when there is a positive pulse on line 63, transistor Q10, which is part of automatic background control 47, is turned on. When transistor Q10 is turned on, capacitor C11 is shorted out. In effect, this forces the output of amplifier U5 to zero volts. With the output of amplifier U5 at zero volts, field effect transistor Q11 is turned on. This doubles the gain of amplifier U1 during the retrace time. Therefore, as soon as the retrace is over and light source 10 is turned on at the beginning of a scan line, maximum gain is available and the circuitry can very quickly adjust to the background, whatever it may be. Therefore, at the beginning of a scan, photodetector 40 sees either the edge of a document or the platen back if the document is not properly registered. The leading edge of the platen back is gray, rather than white, and since the gain of amplifier U1 is doubled, the automatic background control circuitry will see that gray is below zero volts. Operational amplifier U8 is an inverting amplifier, so if we get a positive current flowing into the current amplifier 46 through resistor R17, the output of amplifier U8 is a negative voltage. This negative voltage at the output of amplifier U8 will be translated to a negative voltage at the output of amplifier U1 and, if that signal current is large enough, the voltage at the base of transistor Q8 will be pulled down below the reference level which is set up at the base of transistor Q7. Transistors Q7 and Q8 form another differential amplifier which looks at the output of amplifier U1. This differential amplifier looks for that output to go below the white level. In other words, in looking at background and looking for background to be at a given level, anything below that background level is going to cause the circuitry to try to adjust the gain to that level. So, because the gain has been doubled no matter what is being looked at, if it's below a certain density it's going to be below zero volts and transistor Q8 will be turned on. With transistor Q8 turned on, current flows into the inverting input terminal of amplifier U5. Since this is a positive current flowing into the inverting input terminal of amplifier U5, the output of amplifier U5 has to start falling negative to compensate for that current in order to maintain the inverting input terminal at zero volts, since the noninverting input terminal of amplifier U5 is fixed at zero volts. Therefore, the voltage at the output terminal of amplifier U5 is falling negatively and it continues to fall negatively until transistor Q11 is turned off.

When transistor Q11 turns off, this changes the gain of amplifier U1 back to what it originally was instead of double what it was. At this point, the output of amplifier U5 turns on transistor Q9. This in turn turns on transistor Q13, which is another background adjusting transistor. This provides maximum gain out of amplifier U1, which keeps transistor Q8 on since transistor Q11 is still on. Transistor Q8 conducts until transistor Q11 turns off. When transistor Q11 is turned off, transistor Q9 is turned on, which starts charging up capacitor C15. This decreases the gain of transistor Q11 until the output of amplifier U1 is brought up to zero volts or slightly above zero volts. When the output of amplifier U1 is above zero volts, transistor Q8 starts to turn off. When transistor Q8 is turned off, the output of amplifier U5 remains whereever it was, keeping transistor Q9 on and transistor Q11 off. As the output of amplifier U1 goes positive above zero volts, this tends to turn transistor Q8 off, indicating that the gain has been decreased to the point where now the background level is set. If transistor Q8 is off, the output of amplifier U5 does not change. It tries to hold transistor Q9 off, but trasistor Q8 is also providing current for transistor Q9 to conduct to charge capacitor C15. So therefore, since transistor Q8 is off, transistor Q9 is off, and capacitor C15 has to maintain whatever voltage it was set to before transistor Q8 turned off, therefore maintaining the gain of transistor Q13 at that level. As long as the photodetector 40 is looking at background, approximately zero volts is maintained at the output of amplifier U1.

Now, as the light beam scans across the document and hits a black area, the current into amplifier U8 will decrease due to the photodetector 40 having less light impinging thereon. Therefore, the output of amplifier U8 will go towards zero volts and the output of amplifier U1 will go from zero volts toward +10 volts. If it does that, amplifier U4's output also goes toward +10 volts. As the output of amplifier U4 goes toward +10 volts, it turns on transistor Q6, the base of transistor Q6 being set at approximately 1.2 volts. Transistor Q6 turns on when the voltage at its emitter is approximately 1.8 volts or above. When transistor Q6 turns on, it forces this 1.8 volts, or greater, onto resistor R37, since transistor Q6 quickly saturates. So therefore, at the upper side of resistor R37, there is approximately 1.8 volts minus the saturation voltage of transistor Q6. Capacitor C15 will have a negative voltage on it, transistor Q13 operating in its linear region on negative gate voltages. Transisotr Q13 is completely on when its gate is at zero volts and gradually turned off as the voltage goes negative. This is what happened during the background adjustment. Transistor Q13 was adjusted off, or at some point where the voltage across the drain to source of transistor Q13 was such that there was a given signal level out of amplifier U1. Transistor Q13 operates such that it is completely off with −7 volts at its gate and it is completely on with its gate at zero volts. Therefore, the gate of transistor Q13 is always negative. Thus, the voltage on capacitor C15 is always negative. Therefore, when a positive voltage is applied to resistor R37, diode CR5 is reverse biased. If diode CR5 is reverse biased, the charge on capacitor C15 is slowly leaked off through resistor R28, which is chosen so that in combination with capacitor C15 there is a very large time constant, on the order of 100 seconds. Thus, during black levels, the circuitry is trying to maintain that fixed gain that was adjusted to during background. The charge on capacitor C15 is slowly leaking off so that the next time background is looked at, the circuitry will have some reference to adjust to.

It takes several scan lines, on the order of approximately 20 scan lines, before there is any noticeable difference of the charge on capacitor C15. However, if the output of amplifier U4 goes below this 1.8 volts, transistor Q6 is turned off. When transistor Q6 turns off, that indicates that now again photodetector 40 is looking at background. With transistor Q6 turned off, this forward biases diode CR5, since it starts conducting toward −15 volts through resistor R37. The value of resistor R37 is chosen to be much less than the value of resistor R28. Therefore, capacitor C15 will start to quickly discharge. When capacitor C15 discharges, this changes the conductivity of transistor Q13 and increases the gain of amplifier U1, therefore pulling the output of amplifier U1 farther toward zero volts. This turns on transistor Q8. Transistor Q9 is then turned on by the output of amplifier U5 which remains at a voltage tending to keep transistor Q9 on. Capacitor C15 then starts charging up. Therefore, any time that the photodetector 40 sees white, there is a much faster response in adjusting the background level. When power is first turned on, capacitor C14, diode CR2 and diode CR3 help to prevent the voltage at the gate of transistor Q13, and therefore the voltage across capacitor C15, from going much above zero volts. Diodes CR2 and CR3 clamp that voltage and capacitor C14 tends to slow the rate of charge, so the background adjustment circuitry takes control of the discharge.

Accordingly, there has been shown an illustrative arrangement of an amplifier for use in a document scanning system to provide signals representative of the information content of a scanned document. It is understood that the above-described arrangement is merely illustrative of the application of the principles of this invention. Numerous other arrangements may be devised by those skilled in the art without departing from the spirit and scope of this invention. While the above-described arrangement has been shown as being utilized in a facsimile system, it is understood that this is not intended to be limiting and that the principles of this invention may be utilized in any other suitable environment.

What is claimed is:

1. In a document scanning system including means for repetitively sweeping a beam of light generated by a light source along a line-like scanning station in a scanning direction and a retrace direction, means for turning off said light source during the interval that said light beam is moving in said retrace direction, means generating a retrace signal during said interval, and photosensitive means positioned at said scanning station to collect light reflected from a document at said scanning station and provide an electrical signal proportional to the amount of said reflected light, amplification means for providing an output signal representative of the information content of a scanned document, said amplification means comprising
   current amplifier means coupled to said photosensitive means for amplifying said electrical signal,
   black level adjustment means operative in response to said retrace signal for controlling the output of said current amplifier means so as to compensate for leakage current from said photosensitive means, and
   background control means responsive to variations in the output of said current amplifier means for adjusting the range of said variations to a predetermined range to compensate for differences of background of different scanned documents.

2. The amplification means of claim 1 wherein said black level adjustment means includes
   comparator means for comparing the output of said current amplifier means to a fixed reference level and providing a difference signal, and
   current diverting means responsive to said difference signal for drawing any leakage current supplied by said photosensitive means in the presence of said retrace signal away from said current amplifier.

3. The amplification means of claim 2 wherein said current diverting means includes capacitor means charged by said difference signal and means responsive to the charge on said capacitor means for drawing said leakage current away from the input of said current amplifier means.

4. The amplification means of claim 3 wherein said charge responsive means includes a field effect transistor having its gate coupled to said capacitor means.

5. The amplification means of claim 1 wherein said output signal varies from a low voltage level representing the background of said scanned document to a high voltage level representing the density of a mark on said scanned document, and said background control means includes memory means for storing the lowest value of said output signal for said scanned document.

6. The amplification means of claim 5 wherein said memory means comprises a second capacitor means for storing a charge representative of the background level of said scanned document.

7. The amplification means of claim 6 wherein said background control means further includes means responsive to the charge on said second capacitor means for controllably attenuating the output of said current amplifier means.

8. The amplification means of claim 7 wherein said charge responsive means includes a field effect transistor having its gate coupled to said capacitor means.

9. The amplification means of claim 6 wherein said second capacitor means has a charge path with a relatively short time constant and a discharge path with a relatively long time constant, whereby changes in the background level of the document being scanned are accommodated by a change in the charge stored on said second capacitor means which otherwise maintains a substantially constant charge.

* * * * *